United States Patent [19]
Kloosterboer et al.

[11] Patent Number: 5,437,896
[45] Date of Patent: Aug. 1, 1995

[54] METHOD OF PREPARING A COMPOSITE MATERIAL OF SILICA NETWORK AND CHAINS OF A POLYHYDROXY COMPOUND AND A LIQUID CRYSTAL DISPLAY DEVICE INCORPORATING SUCH COMPOSITE MATERIAL

[75] Inventors: Johan G. Kloosterboer; Fredericus J. Touwslager, both of Eindhoven, Netherlands

[73] Assignee: U.S. Philips corporatin, New York, N.Y.

[21] Appl. No.: 271,294

[22] Filed: Jul. 6, 1994

[30] Foreign Application Priority Data

Jul. 6, 1993 [EP] European Pat. Off. ............ 93201973

[51] Int. Cl.$^6$ .................................... G02F 1/1333
[52] U.S. Cl. ........................... 428/1; 522/172; 522/83; 522/99; 427/515; 359/68
[58] Field of Search .............. 428/1; 522/172, 83, 522/99; 427/515; 359/68, 66

[56] References Cited

U.S. PATENT DOCUMENTS 5,204,381  4/1993  Zeigler ................... 522/172
5,360,834  11/1994  Popall et al. ............. 522/172

FOREIGN PATENT DOCUMENTS 0448139  9/1991  European Pat. Off. .

OTHER PUBLICATIONS

"'Inverse' Organic–Inorganic Composite Materials", by B. Novak et al, Macromolecules Dec. 1991, 24, pp. 5481–5483.

"The photopolymerization of Acrylates and Methacrylates Containing Silicon", by r. S. Davidson et al, Polymer, Dec. 1992, vol. 33, No. 14, pp. 3031–3036.

"New Surface–Coating Materials: Electron–Beam Curing of Some Silicon–Containing Acrylates", by R. J. Batten et al, Polymer, Dec. 1992, vol. 33, No. 14, pp. 3037–3043.

*Primary Examiner*—Alexander S. Thomas
*Attorney, Agent, or Firm*—John C. Fox

[57] ABSTRACT

Method of preparing a composite material comprising a silica network and chains of a polyhydroxy compound which are interwoven therewith and a liquid crystal display device having a top coat of such a composite material.

A description is given of a method of preparing a composite material comprising a silica network and, interwoven therewith, chains of, for example, polyhydroxyalkyl acrylate, by first photopolymerizing a tetraalkenyl orthosilicate with UV-light and subsequently converting it into the composite material by subjecting it to a sol-gel treatment. The material obtained is optically transparent. In addition, the material exhibits very little shrinkage so that it can be deposited on a substrate in relatively thick layers. The composite material is very suitable for a top coat 5 on a color-filter layer 3 in a liquid crystal display device because, inter alia, it adheres well to the ITO layer 7.

8 Claims, 2 Drawing Sheets

METHOD OF PREPARING A COMPOSITE MATERIAL OF SILICA NETWORK AND CHAINS OF A POLYHYDROXY COMPOUND AND A LIQUID CRYSTAL DISPLAY DEVICE INCORPORATING SUCH COMPOSITE MATERIAL

BACKGROUND OF THE INVENTION

The invention relates to a method of preparing a composite material comprising a silica network and, interwoven therewith, chains of a polyhydroxy compound, a mixture comprising an alkenyl-orthosilicate monomer and a photoinitiator being converted into said silica network by hydrolysis and polycondensation and into said polyhydroxy compound by radical polymerization.

The invention also relates to a liquid crystal display device comprising a transparent substrate having a colour-filter pattern which is covered by a top coat containing polyacrylate.

The invention further relates to a method of manufacturing such a device.

Such inorganic-organic copolymers are referred to as ORMOCERs TM (ORGanically MOdified CERamics), CIOMATS (Composite Inorganic Organic MATerials) or CERAMERs (CERAmic polyMERs)in literature and are used, for example, in optical components and as protective coatings for electronic and optical devices and as waveguides in micro-optical systems. In general, said materials are optically transparent in the visible wavelength range and adhere well to various substrates, such as ceramics, glass, metals and polymers.

The silica network forms a glass consisting of a three-dimensional structure of covalently bonded silicon oxides. The polymer chains occupy the empty spaces within the silica network and are interwoven therewith, while forming a composite material consisting of an inorganic matrix of silicon oxide and organic polymer chains. The organic polymer gives the composite material a high tensile strength, a high modulus of elasticity and a high impact strength, and the three-dimensional inorganic matrix gives the material a high hardness, a high scratch resistance and a high compressive strength. Such a composite material can be advantageously obtained by applying a sol-gel process because of the mild reaction temperatures used in said process. The sol-gel process is based on the homogeneous hydrolysis and condensation of metal alkoxides (metal M is, for example, Si, Ti, Zr, Ti, Ge, Al) in the presence of water to form cross-linked, swollen metal-oxide networks. A frequently used silicon alkoxide is tetraethyl orthosilicate: $Si(OC_2H_5)_4$ (TEOS). When TEOS is brought into contact with water, the following reactions take place:

Hydrolysis:
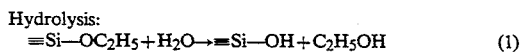
$\equiv Si-OC_2H_5 + H_2O \rightarrow \equiv Si-OH + C_2H_5OH$ (1)

Condensation:
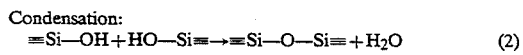
$\equiv Si-OH + HO-Si\equiv \rightarrow \equiv Si-O-Si\equiv + H_2O$ (2)

Net reaction:
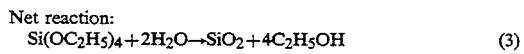
$Si(OC_2H_5)_4 + 2H_2O \rightarrow SiO_2 + 4C_2H_5OH$ (3)

In accordance with reaction (2), a network of silica is formed (polycondensation). The reaction product is dried in order to remove the excess water and the liberated alcohol (ethanol in the above example). The mild reaction temperatures enable an organic oligomer or polymer to be dissolved in the sol-gel solution. After hydrolysis and condensation, the polymer is homogeneously embedded in the silica network under favourable conditions. However, few polymers can be dissolved in the sol-gel solution. Besides, extraordinary shrinkage (approximately 70%) occurs upon drying the swollen network as a result of the evaporation of the liberated alcohol. Therefore, coatings of silica can only be made in very small thicknesses (<0.1 µm); at greater thicknesses said coatings crack.

In an article by B. M. Novak et at. in Macromolecules, 24, pp. 5481-5483 (1991) it is proposed to use silanes with polymerizable groups, such as tetraalkenyl orthosilicates, in such a method in place of silanes with methoxy or ethoxy groups commonly used in sol-gel processes. Silane tetra(hydroxyethyl acrylate ester) (STEA) (official name: tetrakis(2-hydroxy ethoxy)silane, tetra acrylate ester) is mentioned as an example of such a compound. The hydrolysis and condensation of this compound liberate a polymerizable unsaturated alcohol, namely 2-hydroxyethyl acrylate. By UV-exposure in the presence of a photoinitiator, but preferably thermally in the presence of a suitable catalyst mixture of ammonium persulphate and N,N,N', N'-tetramethylethylene diamine and by using a stoichiometric quantity of water, a silica network is formed at room temperature by hydrolysis and condensation of the silicate ester and, simultaneously, a polyacrylate is formed by radical polymerization of the acrylate groups. In this manner, a so-called interpenetrating network is formed. Since the liberated alcohol (2-hydroxyethyl acrylate) polymerizes to polyhydroxyethyl acrylate, drying of the gel formed is, in principle, unnecessary and hardly any shrinkage occurs during the polymerization step. According to said article, it is important that the inorganic silica network and the organic polymer are formed simultaneously. It is essential that the reaction rates of both polymerization processes are accurately matched. If the formation of the silica network takes place at a higher rate than the formation of the organic polymer, an opaque, brittle glass is formed which is also subject to shrinkage as a result of the evaporation of unreacted monomer. Dominant organic polymerization rates cause precipitation of said polymer, which results in phase separation. In either case, a turbid, highly scattering product is obtained which is unsuitable for optical applications. According to said article, it is tried to make both polymerization reactions proceed at similar rates by adding the appropriate quantity of ammonium persulphate to the reaction mixture. A disadvantage of this known method is that similar polymerization-reaction rates are difficult to achieve, so that the abovementioned adverse effects can occur.

OBJECTS AND SUMMARY OF THE INVENTION

It is an object of the invention to provide, inter alia, a method which does not have the above-mentioned disadvantage and which enables low-shrinkage layers having a thickness of 0.1 µm or more to be manufactured. The invention further aims at providing a liquid crystal display device having an improved top coat and a method of manufacturing such a device.

The object of providing a method of preparing a composite material is achieved, in accordance with the invention, by a method as described in the opening paragraph, which is characterized in that for the alkenyl-orthosilicate use is made of a monomer of the formula:

$$R^3_p\text{—Si}(\text{—O—}R^1\text{—}R^2)_{4-p}$$

where p is 0 or 1, and $R^1$ represents a methylene group and $R_2$ represents a vinyl group, or $R_1$ represents a $C_1$–$C_{10}$ alkylene group and $R_2$ represents a vinyloxy group, allyloxy group, acryloxy group or methacryloxy group, and $R^3$ represents a $C_1$–$C_{12}$ alkyl group, aryl group or (meth)acryloxy($C_1$–$C_{10}$)alkylene group, and in that first the radical polymerization is carrier out by exposure to UV-light, thereby forming a siloxy-polymer network, after which said siloxy-polymer network is subjected to hydrolysis and polycondensation to convert it into the silica network and the chains of the polyhydroxy compound interwoven with said silica network.

The silane monomer comprises at least three polymerizable and hydrolyzable groups which are bonded to the silicon atom via an oxygen atom in order to be able to form a three-dimensional silica network. A suitable polymerizable group is, for example, the allyloxy group ($R^1$=—$CH_2$— and $R^2$=—CH=$CH_2$). Suitable alkylene groups $R^1$ are, for example, the ethylene group, propylene group and butylene group. The silane monomer comprises maximally one unhydrolyzable group $R^3$. Suitable groups $R^3$ are, for example, the methyl group, octyl group, dodecyl group, phenyl group and benzyl group. The group $R^3$ can also be photopolymerizable, for example a (meth)acrylate group which is bonded to the Si atom via a $C_1$–$C_{10}$ alkylene group. The preparation of these and other silane monomers is described in an article by R. S. Davidson et. at. in Polymer, Vol. 33, No. 14, pp. 3037–3043 (1992).

The polymerizable groups of the silane are polymerized by exposure to UV-light, thereby forming a siloxy-polymer network consisting of polymer chains which are coupled to each other via SiO bonds. In the subsequent sol-gel treatment, the network obtained is converted into a silica network by hydrolysis and condensation, and into loose, i.e. not bonded to the silica network, chains of the polyhydroxy compound without visible phase separation taking place. The polymer chains formed are interwoven with the silica network, however, they are not chemically bonded thereto. It has been found that by separating both polymerization reactions, i.e. first the formation of the polymer and then the formation of the silica network, an optically transparent composite material is formed in which no visible phase separation has taken place. As set forth hereinabove, little shrinkage occurs because no alcohol is liberated during the hydrolysis and condensation reactions.

Monomers which can suitably be used in the method in accordance with the invention are given by the general formula $R^3_p$—Si(OR)$_{4-p}$, where R represents an alkyl(meth)acrylate group and $R^3$ and p have the above-stated meaning. Monomers which fall within said formula are, for example:

silane tetra(hydroxymethyl acrylate ester) (STMA),
silane tetra(hydroxyethyl acrylate ester) (STEA) and
silane tetra(hydroxypropyl acrylate ester) (STPA).
The official names of these monoers are:
tetralis (2-hydroxy methoxy)silane, tetra acrylate ester;
tetralis (2-hydroxy ethoxy)silane, tetra acrylate ester; and
tetralis (2or 3-hydroxy propoxy)silane, tetra acrylate ester.

Said silane monomers can be prepared in a simple manner by reacting tetrachlorosilane (SiCl$_4$) with the relevant hydroxyalkyl acrylate in the presence of a base, such as triethylamine. Longer alkyl chains of the alkyl acrylate group (for example a pentyl acrylate group) bring about a more hydrophobic compound, as a result of which it is more difficult to hydrolyze said compound. When said monomers are used in the method in accordance with the invention, polyhydroxyalkyl acrylate chains are formed which are interwoven with the silica network.

For the radical initiator use is made of photoinitiators which absorb UV-light, for example, in the wavelength range between. 350 and 380 nm. Suitable photoinitiators are, for example, 1-benzoyl- 1-cyclohexanol (Irgacure TM 184, Ciba-Geigy), 2,2-dimethoxy-2-phenylacetophenone (Irgacure TM 651, Ciba Geigy) and 2-hydroxy-2,2-dimethyl-1 -phenyl-ethane-1-one (Darocur TM 1173, Merck). The photoinitiator is added to the silane monomer in a concentration of 1–4 wt.%. Photopolymerization takes place with UV-light having a wavelength of, for example, 350 nm, preferably under an inert gas atmosphere of, for example, nitrogen. Photopolymerization in air is also possible, however, it requires a higher exposure intensity.

The sol-gel process which takes place after the photopolymerization reaction is carried out by treating the exposed mixture with water. This treatment can be carried out by immersing in water to which an acid or base is added as the catalyst or via the vapour phase using water vapour. Preferably, the sol-gel process is carried out with the stoichiometric quantity of water, i.e. ½ mole of water per hydrolyzable group per mole of monomer silane. In this manner, all the water for the sol-gel reaction is used, so that shrinkage caused by drying is precluded. If the sol-gel reaction takes place by immersing in water or via the vapour phase using; water vapour, for example, hydrochloric acid or ammonia can be used as the catalyst.

After the sol-gel process, the composite material obtained is preferably brought to an increased temperature of, for example, 180° C. in order to remove any unreacted monomer and any excess water. The composite material obtained is optically transparent and exhibits no visible phase separation.

In a suitable embodiment of the method in accordance with the invention, the mixture of the above-mentioned silane monomer and the photoinitiator is provided as a uniform film on a substrate, after which a coating is formed from the composite material. Said mixture is liquid at room temperature, and can be used without solvents. The film can be obtained by spin coating or spraying said mixture onto the substrate. After, in succession, photopolymerization and the sol-gel treatment, a coating of said composite material is obtained. Since the shrinkage of the composite material obtained by means of the method in accordance with the invention is small, layer thicknesses of the coating in excess of 10 μm can be obtained in a simple manner without said coating becoming crackled. The coating obtained is optically transparent and exhibits no visible phase separation. For the substrate material, use can be made of, for example, glass, metal, ceramics or polymer.

The method in accordance with the invention is very suitable for the manufacture of a pattern of a composite material consisting of a silica network and, interwoven therewith, chains of the polyhydroxy compound. To this end, a mixture of one of the above-mentioned silane monomers and a photoinitiator is provided on a substrate as a uniform film which is then exposed to patterned radiation. Said patterned irradiation can take place by exposing the applied film via a mask or by exposure to a (UV) laser light beam. The siloxy-polymer network is formed in the exposed areas of the film. After exposure, the pattern is developed by dissolving the unexposed parts of the film in an organic solvent, for example ethyl acetate or methyl ethyl ketone. The exposed pattern is subsequently brought into contact with water via the vapour phase or via immersion, the silica network and the interpenetrating polyhydroxy compound being formed by hydrolysis, polycondensation and drying. In this manner, relatively thick (for example 10 $\mu$m) patterns of optically transparent composite material can be provided on substrates in a simple manner. This method in accordance with the invention can for example be used for the manufacture of a colour-filter pattern on the passive plate of a liquid crystal display device (LCD and LC-TV). The passive plate comprises a transparent supporting plate of, for example, glass, quartz or quartz glass, on which colour filters in the colours blue, green and red are provided in accordance with a pattern. To increase the contrast a so-called black matrix may be provided between the colour filters. Said black matrix may be, for example, a grating of chromium but it may alternatively be formed by black colour filters. The individual picture elements (pixels) of such colour filters have dimensions of, for example, 50×70 $\mu$m and a thickness of 1 $\mu$m. Well-known techniques of providing colour-filter patterns are screen printing, offset printing, inkjet printing and conventional lithographic techniques. The method in accordance with the invention enables colour-filter patterns to be provided on the glass supporting plate, the mixture of the silane monomer and photoinitiator also containing a blue, green, red or black dye or pigment. After, in succession, photopolymerization and the sol-gel treatment the composite material obtained also comprises the desired dye. The colour-filter pattern thus obtained also has the advantage that it adheres well to the ITO (tin-doped indium oxide) electrode layer to be provided on said colour-filter pattern. A customary top coat of silicon oxide which serves to improve the adhesion of ITO to the colour-filter pattern can be omitted.

The object of providing a liquid crystal display device having an improved top coat is achieved in accordance with the invention by a display device as described in the opening paragraph, which is characterized in that the top coat comprises a composite material of a silica network and, interwoven therewith, a polyhydroxyalkyl acrylate. Customarily, the colour-filter pattern and, if present, a black matrix of such a display device are provided with a top coat to smooth the surface and improve the adhesion of the electrode layer of transparent, electrically conductive metal oxide to be provided thereon. For the conductive metal oxide use is often made of indium oxide, tin oxide or ITO. Such a display device is known from European Patent Application EP-A-448139. For the top coat use is made of, for example, vapour deposited or sputtered $SiO_2$ or a layer of a polyacrylate resin. Vapour deposition and sputtering are relatively costly processes since they are time-consuming and require expensive vacuum equipment. Polyacrylate resin has the disadvantage that it adheres poorly to metal oxides such as ITO. Spin coating of TEOS followed by a sol-gel treatment and drying to obtain a silica coating has the above-mentioned disadvantage that extraordinary shrinkage occurs, so that the layer thickness can maximally be 0.1 $\mu$m. A layer having such a small thickness of 0.1 $\mu$m holds the risk of crosstalk between the picture elements due to too high a capacitance of the top coat and of electrical breakdown between the black matrix (in the case of chromium) and the electrode layer. To overcome these disadvantages, a layer thickness of the top coat of at least 1 $\mu$m is required. The composite material obtained by the method in accordance with the invention, which consists of a silica network and, interwoven therewith, polyhydroxyalkyl acrylate chains forms a very suitable alternative to the material of the top coat. This composite material does not crackle up to layer thicknesses of at least 10 $\mu$m and, due to the presence of silica, adheres excellently to metal oxides such as ITO. If necessary, the surface of the top coat is previously subjected to a short treatment with an oxygen plasma.

A method of manufacturing a device in accordance with the invention is characterized in that the top coat is prepared by applying a film of a mixture of a silane-tetra(hydroxyalkyl acrylate) monomer and a photoinitiator to the colour-filter pattern, after which first a photopolymerization process is carried out by exposure to UV-light to form a siloxy-acrylate network, whereafter said siloxy-acrylate network is subjected to hydrolysis and polycondensation to convert it into the silica network and the polyhydroxyalkyl acrylate chains interwoven with said silica network. If necessary, the top coat obtained is subjected to an oxidation treatment, for example using an oxygen plasma, to obtain a very thin $SiO_x$ skin ($1 < X \leq 2$) at the surface of the top coat. Said $SiO_x$ skin results in an improved adhesion to the ITO layer.

BRIEF DESCRIPTION OF THE DRAWINGS

The invention will be explained in greater detail by means of exemplary embodiments and drawings, in which.

DESCRIPTION OF THE PREFERRED EMBODIMENTS

Exemplary Embodiment 1

Figure 1:
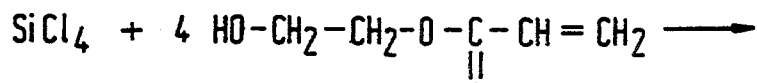
FIG. 1 shows the reaction equation of the preparation of STEA.
Figure 1:
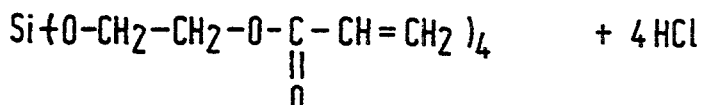

Preparation of silane-tetra(hydroxyethyl acrylate ester) (STEA),

The reaction equation for the preparation of STEA is shown in FIG. 1. Tetrachlorosilane reacts with 2-hydroxyethyl acrylate (I) in the presence of triethylamine to form STEA (II). The preparation of these and other silane monomers is described in articles by R. S. Davidson et. al. in Polymer, Vol. 33, No. 14, pp. 3031-3036 and pp. 3037-3043. The preparation of silane hydroxybutyl acrylate esters and silane hydroxypropyl acrylate esters (respectively STBA and STPA) takes place in a similar way.

Preparation of composite material in accordance with the invention.

Figure 2:
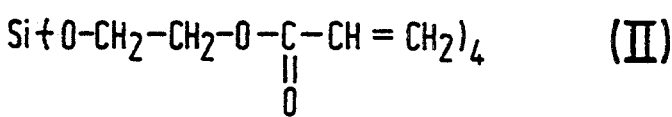
FIG. 2 shows the reaction equation of the photopolymerization of STEA to a siloxy-acrylate network which is subsequently converted into a silica network and, interwoven therewith, polyhydroxyacrylate chains by a sol-gel treatment.
Figure 2:
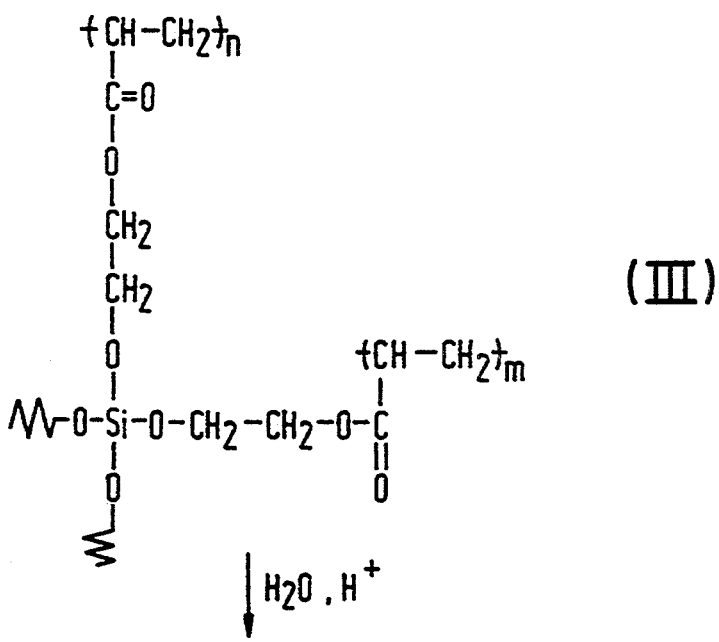
Figure 2:
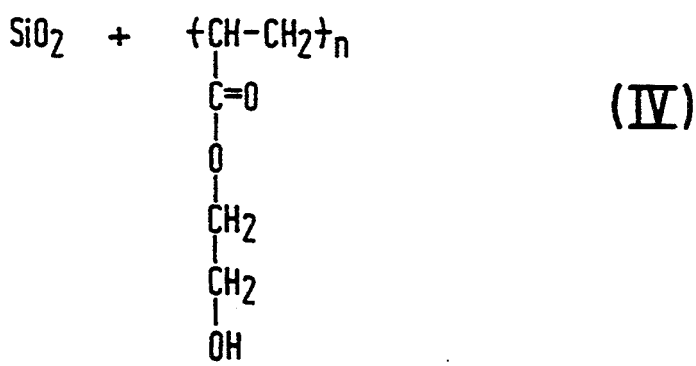
Figure 3:
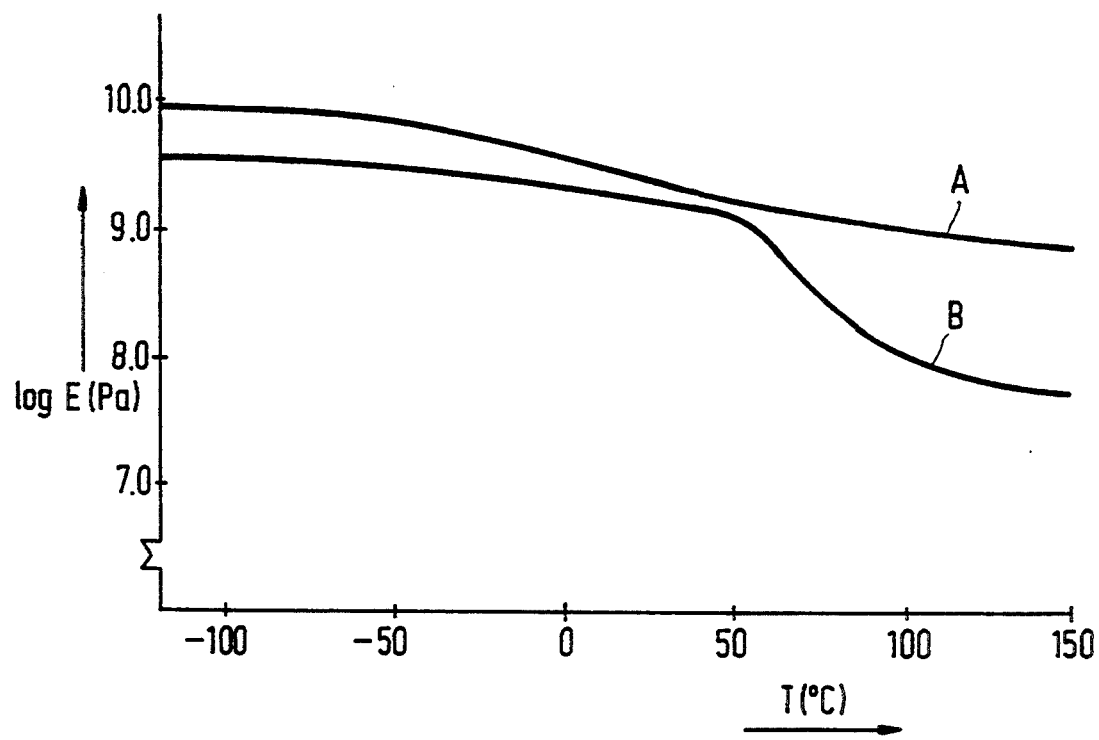
FIG. 3 shows the logarithm of the modulus of elasticity E (Pa) as a function of the temperature T (°C.) of STEA which is photopolymerized (curve A) and of STEA which, in accordance with the invention, is first photopolymerized and then subjected to a sol-gel treatment (curve B)

A mixture of STEA and 1 wt. % 2,2-dimethoxy-2-phenylacetophenone (Irgacure TM 651, Ciba-Geigy) as the photoinitiator is poured into a PTFE mould having internal dimensions of 40×10×1 min. The mixture is exposed to UV-light of a wavelength of 350 nm and an intensity of 0.2 mW/cm² at room temperature under a nitrogen atmosphere for 10 minutes. Said exposure causes STEA (II) to be converted into a siloxy-acrylate network (see FIG. 2 (III)). In formula III, n and m denote integers and have values in the range from, for example, 5-10000. After the preparation obtained has been removed from the mould, it is subjected to a dynamic mechanical thermal analysis (DMTA) in a measuring apparatus constructed by Polymer Laboratories. In this apparatus, the modulus of elasticity E (in Pa) is determined as a function of the temperature T (in ° C.). The elongation of the preparation is periodically varied with a frequency of 1 Hz and an amplitude of 16 μm, and the temperature is increased at a rate of 4° C./minute. The result is shown in FIG. 3 (curve A). The preparation obtained in a thickness of 1 mm is then subjected to a sol-gel treatment by bringing it into contact, via the vapour phase, with the stoichiometric quantity of water which contains 6 mol/l hydrochloric acid as the catalyst for 2 days. The hydrolysis and polycondensation taking place in this process result in the formation of a composite material consisting of a silica network and polyhydroxyethyl acrylate chains (see FIG. 2 (IV)) interwoven therewith. The composite material is dried at 180° C. for 2 hours. There is hardly any shrinkage and the material obtained is optically transparent. The DMTA measurement of the composite material obtained in accordance with the invention is shown in curve B of FIG. 3. Up to approximately 50° C. the modulus of elasticity E decreases only slightly relative to the material which has not been subjected to a sol-gel treatment. The silica network formed provides the composite material with a high hardness, high scratch resistance and high compressive strength.

Exemplary Embodiment 2

A mixture of STEA and 1 wt. % 1-benzoyl-1-cyclohexanol (Irgacure TM 184, Ciba-Geigy) as the photoinitiator is spin coated as a liquid layer onto a glass substrate. A nickel mask having holes with a diameter of 100 μm is arranged directly above said layer. The layer is exposed to UV-light of a wavelength of 350 nm and an intensity of 0.2 mW/cm² via this mask for 5 minutes. Said exposure takes place under a nitrogen atmosphere. The layer obtained has a thickness of 10 μm. The pattern is developed with methyl ethyl ketone, the unexposed parts of the layer being removed from the glass substrate. The exposed parts of the layer are then brought into contact, via the vapour phase, with the stoichiometrically required quantity of water which contains 6 mol/l hydrochloric acid. Finally, the pattern of composite material obtained is dried at 180° C. for 2 hours. The pattern obtained consists of cylinders having a diameter of 100 μm and a thickness of 10 μm. The material is optically transparent and not crackled.

Exemplary Embodiment 3

Figure 4:
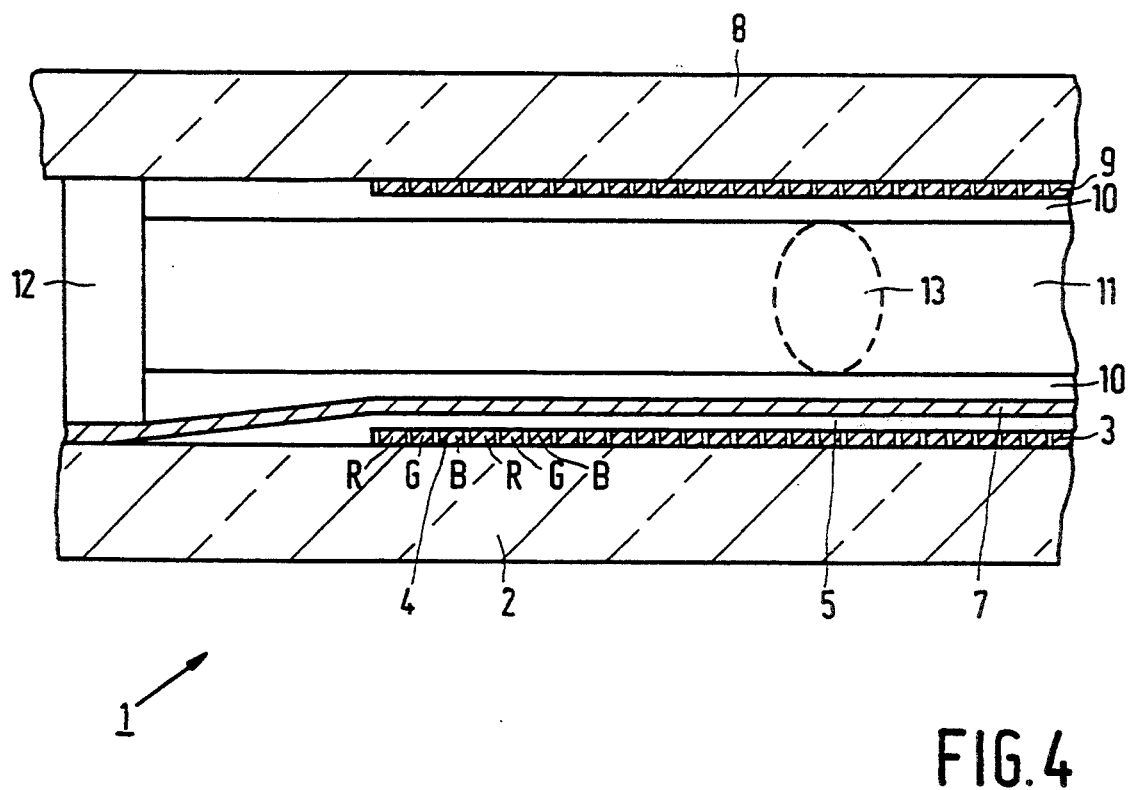
FIG. 4 schematically shows a part of a cross-section of a liquid crystal display device in accordance with the invention.

FIG. 4 schematically shows a part of a cross-section of a liquid crystal display device 1. Reference numeral 2 denotes a 1 mm thick glass supporting plate on which a colour-filter layer 3 consisting of colour cells 4 (red R, green G and blue B) which correspond to picture elements is provided by means of methods which are customary in the liquid crystal technology. The colour-filter layer 3 is provided with a 2 μm thick top coat 5 which is prepared in accordance with the method of the invention from a composite material of a silica network and polyhydroxyethyl acrylate chains which are interwoven therewith. The top coat 5 has a smoothing effect and also serves as an adhesive layer for the electrode layer 7 which is to be provided thereon and which consists of a pattern of transparent ITO electrodes. Said ITO electrodes 7 have a thickness of 135 nm and, by virtue of the presence of silica in the top coat 5, adhere very well to the latter layer. In addition, the top coat 5 is resistant to temperatures which occur during the provision of an ITO layer, for example during sputtering and vapour deposition. Said ITO layer is structured to form the pattern 7 of ITO electrodes in a customary photolithographic process. The device further comprises a second supporting plate 8 on which electrodes 9 of ITO are provided which define picture elements either because the electrodes 9 and the electrodes 7 form a crossbar system in which the crossings define the picture elements, or because the electrodes 9 form picture electrodes which are controlled by a system (not shown) of switching elements, drive lines and data lines. In the latter case the electrodes 7 can be constructed so as to form one uniform layer. Orientation layers 10 of polyimide having a thickness of 40 nm are applied to the electrode layers 7 and 9. A layer of liquid crystal material 11 is present between the orientation layers 10. The distance between the two supporting plates 2 and 8 is kept constant by means of a sealing: edge 12 and spacers 13.

The top coat 5 which is prepared by means of the method in accordance with the invention is hard and scratch resistant, so that said layer cannot be depressed at the location of the spacers 13. In addition, the top coat 5 has the above-mentioned advantage that it adheres well to the ITO layer 7. Since the top coat 5 can be provided in a relatively great thickness, the risk of electrical breakdown and cross-talk between the picture elements is substantially reduced. An additional advantage of such a top coat is that vapour-deposition or sputtering of $SiO_2$ onto the colour-filter layer 3 is no prerequisite for the provision of the satisfactorily adhering ITO.

We claim:

1. A method of preparing a composite material comprising a silica network and, interwoven therewith, chains of a polyhydroxy compound, the method comprising converting a mixture comprising an alkenyl-orthosilicate monomer and a photoinitiator into said silica network by hydrolysis and polycondensation, and into said polyhydroxy compound by radical polymerization, characterized in that the alkenyl-orthosilicate monomer has the formula:

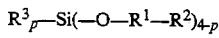

where p is 0 or 1, and

R$^1$ represents a methylene group and R$^2$ represents a vinyl group, or

R$^1$ represents a C$_1$-C$_{10}$ alkylene group and R$^2$ represents a vinyloxy group, allyloxy group, acryloxy group or methacryloxy group, and R$^3$ represents a C$_1$-C$_{12}$ alkyl group, aryl group or (meth) acryloxy(C$_1$-C$_{10}$) alkylene group, and in that first the radical polymerization is carried out by exposure to UV radiation, thereby forming a siloxy-polymer network, after which said siloxy-polymer network is subjected to hydrolysis and polycondensation to convert it into the silica network and the chains of the polyhydroxy compound interwoven with said silica network.

2. A method as claimed in claim 1, characterized in that the monomer comprises tetrakis(hydroxy alkoxy)-silane tetra acrylate ester or alkyl tris(hydroxy alkoxy) silane tri acrylate ester, in that the siloxy-polymer network is a siloxy-acrylate network and the polyhydroxy compound is polyhydroxyalkyl acrylate.

3. A method as claimed in claim 1, characterized in that the monomer comprises tetrakis (2-hydroxy ethoxy) silane tetra acrylate ester.

4. A method as claimed in claim 1, characterized in that hydrolysis is carried out using a stoichiometric quantity of water.

5. A method as claimed in claim 1, characterized in that the mixture is provided as a uniform film on a substrate, and converted into a coating of the composite material.

6. A method as claimed in claim 5, characterized in that the film is exposed to patterned radiation, after which unexposed parts of the film are removed from the substrate by contacting the film with an organic solvent and, subsequently, hydrolysis and polycondensation are carried out by contacting exposed parts of the film with acidified or basified water, to thereby form a pattern of the composite material 7. A liquid crystal display device comprising a transparent substrate, colour-filter pattern on the substrate, a top coat which contains polyacrylate covering the color filter pattern, and an electrode layer of transparent metal oxide on the top coat, characterized in that the top coat comprises a composite material of a silica network and chains of a polyhydroxyalkylacrylate interwoven with said silica network.

8. A method of manufacturing a display device as claimed in claim 7, characterized in that the top coat is prepared by applying a film of a mixture of a silane-tetrakis (hydroxyalkoxy)silane tetra acrylate or alkyl tris(hydroxy alkoxy) silane triacrylate monomer and a photoinitiator to the colour-filter pattern, after which first a photopolymerization process is carried out by exposure to UV-light to form a siloxy-acrylate network, whereafter said siloxy-acrylate network is subjected to hydrolysis and polycondensation to convert it into the composite material.

* * * * *